United States Patent
Rush et al.

[11] Patent Number: 5,918,449
[45] Date of Patent: Jul. 6, 1999

[54] ELECTRICALLY ACTIVATED VACUUM ACTUATOR

[75] Inventors: Robert Rush, Amherst, Ohio; Matthew John Plas, Medina, Ohio

[73] Assignee: MTD Products Inc., Cleveland, Ohio

[21] Appl. No.: 08/874,846

[22] Filed: Jun. 13, 1997

[51] Int. Cl.$^6$ .................................................. A01D 69/00
[52] U.S. Cl. .............................. 56/10.8; 56/11.3; 56/11.6
[58] Field of Search ..................................... 56/10.8, 11.3, 56/11.6, 11.8, 12.2, 13.1, 16.1, 16.9, DIG. 4; 74/15, 11–15.88; 180/53.6

[56] References Cited

U.S. PATENT DOCUMENTS

| | | | |
|---|---|---|---|
| 3,367,459 | 2/1968 | Rubin . | |
| 3,440,740 | 4/1969 | Kamlukin . | |
| 3,528,231 | 9/1970 | Keller et al. | 56/11.3 |
| 3,543,892 | 12/1970 | De Baillie | 56/11.3 |
| 3,656,595 | 4/1972 | Gethmann et al. | 192/13 R |
| 3,901,342 | 8/1975 | Nunn | 180/79.2 R |
| 3,908,345 | 9/1975 | Oni et al. | 56/208 |
| 4,285,169 | 8/1981 | Franklin . | |
| 4,295,327 | 10/1981 | Bortolussi | 56/11.3 |
| 4,364,301 | 12/1982 | Kawabata et al. | 91/20 |
| 4,388,856 | 6/1983 | Cook | 91/49 |
| 4,437,386 | 3/1984 | Baumgartner | 91/363 R |
| 4,515,066 | 5/1985 | Ito et al. | 91/454 |
| 4,531,348 | 7/1985 | DeVilder et al. | 56/11.6 |
| 4,622,859 | 11/1986 | Hobson | 74/15.88 |
| 4,669,361 | 6/1987 | Ito et al. | 91/459 |
| 4,756,234 | 7/1988 | Anderson | 91/454 |
| 4,799,418 | 1/1989 | Takahashi et al. | 91/449 |
| 4,831,915 | 5/1989 | Roach | 92/49 |
| 4,835,949 | 6/1989 | Seyerle | 56/10.8 |
| 4,928,458 | 5/1990 | Muroya . | |
| 5,321,910 | 6/1994 | Legrendre et al. | 49/324 |
| 5,335,487 | 8/1994 | Murakawa et al. | 56/10.8 |
| 5,477,642 | 12/1995 | Legrendre | 49/340 |
| 5,568,761 | 10/1996 | Legendre | 92/46 |
| 5,636,444 | 6/1997 | Nickel | 30/276 |
| 5,651,422 | 7/1997 | Casali | 180/13 |

FOREIGN PATENT DOCUMENTS

| | | | |
|---|---|---|---|
| 5 8018965 | 8/1984 | Japan | 25/2 |
| 2221827 | 2/1990 | United Kingdom | 56/10.8 |

*Primary Examiner*—Thomas B. Will
*Assistant Examiner*—Arpad Fabian Kovacs
*Attorney, Agent, or Firm*—Emerson & Associates; Roger D. Emerson; Timothy D. Bennett

[57] ABSTRACT

A control system for controlling an associated device includes a vacuum actuator, connecting means for operatively connecting the vacuum actuator to the associated device, vacuum means for providing a vacuum to the vacuum actuator, and activating means for selectively electrically activating the vacuum actuator. To engage an associated PTO shaft, an operator switches an electric switch opening a control valve and activating a vacuum actuator. Next a clutch arm is pivoted causing a brake arm to take a PTO pulley out of braking engagement and forcing an idler pulley into operative engagement with a PTO belt. This connects the PTO pulley with a drive pulley thereby rotating the PTO shaft. When the PTO is to be disengaged, the brake arm is effective to stop the motion of the implement driven by the PTO, and to stop the implement within a very short time.

13 Claims, 3 Drawing Sheets

ELECTRICALLY ACTIVATED VACUUM ACTUATOR

BACKGROUND OF THE INVENTION

1. Field of Invention

This invention pertains to the art of methods and apparatuses for vacuum actuators, and more specifically to methods and apparatuses for an electrically activated vacuum actuator used to control an associated device in an off-the-road vehicle.

2. Description of the Related Art

It is well known to provide off-the-road vehicles such as lawn and garden vehicles with a control device. For example U.S. Pat. No. 3,367,459 discloses a control mechanism for engaging and disengaging the implements of a powered vehicle. Examples of such powered vehicles are garden tractors and riding lawn mowers. Examples of such implements are the cutter of a lawn mower, a snow thrower, or other implements powered by a power-take-off-shaft (PTO) commonly used by such vehicles. This control mechanism includes an idler pulley which is used to apply tension to a drive belt thereby disengaging the cutter from the engine. This control mechanism also includes a brake arm. Such a mechanical control mechanism has many advantages including an efficient and dependable engagement means. A disadvantage to such a mechanical control mechanism is that a control handle must be manually adjusted and actuated by the operator. This may require objectionable effort or may be cumbersome for the operator.

It is also known to use an electrical control device in a mower. For example, U.S. Pat. No. 4,928,458 utilizes an electromagnetic solenoid to control an electromagnetic clutch. Such an electric control device has the advantage of being easy for the operator to use. However, electromagnetic clutches have the disadvantage of being abrupt in operation. Such abruptness tends to jar the vehicle components and can prematurely wear the clutch and associated components. All of these components need to be unnecessarily over-sized to absorb the jarring.

The present invention provides methods and apparatuses for combining the benefits of an electrical control device with the benefits of a mechanical control device in a single control system. The difficulties inherent in the art are therefore overcome in a way that is simple and efficient, while providing better and more advantageous results.

SUMMARY OF THE INVENTION

According to one aspect of the present invention, there is provided a control system for controlling an associated device. The control system includes a vacuum actuator, connecting means for operatively connecting the vacuum actuator to the associated device, vacuum means for providing a vacuum to the vacuum actuator, and activating means for selectively electrically activating the vacuum actuator.

According to another aspect of the present invention, the control system selectively engages a power-take-off (PTO) shaft. The connecting means includes mechanical clutching means and a braking mechanism.

According to another aspect of the present invention, there is provided a method for controlling an associated device. First an operator switches an electric switch that opens a control valve. Next a vacuum actuator is activated thereby engaging a mechanical clutching means.

According to still another aspect of the present invention, there is provided a method for engaging an associated PTO shaft. An operator switches an electric switch opening a control valve and activating a vacuum actuator. A clutch arm is then pivoted causing a brake arm to take a PTO pulley out of braking engagement and forcing an idler pulley into operative engagement with a PTO belt. This connects the PTO pulley with a drive pulley thereby rotating the PTO shaft.

One advantage of the present invention is that it combines the benefits of a mechanical clutching mechanism with the benefits of an electrical activating means.

Another advantage of the present invention is that an intake manifold, typically used in internal combustion engines, can be used as a vacuum source.

Another advantage of the present invention is that it is relatively light and easy to manufacture.

Another advantage of the invention is that the implementation of the braking system causes the mower blade to stop quickly after the PTO is disengaged. The invention enables the mower blade to stop quickly enough to meet government requirements for commercial and residential riding lawn mowers. Therefore, the implementation of the invention enables the aforementioned benefits of the vacuum actuator and the electronic engagement means to be incorporated into a residential or commercial garden or lawn tractor.

Another advantage of the invention is the smooth engagement and disengagement of the PTO and engine compensating engagement when used with an internal combustion engine.

Still another advantage of the present invention is that only a small quantity of electric energy is required to operate the control system.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
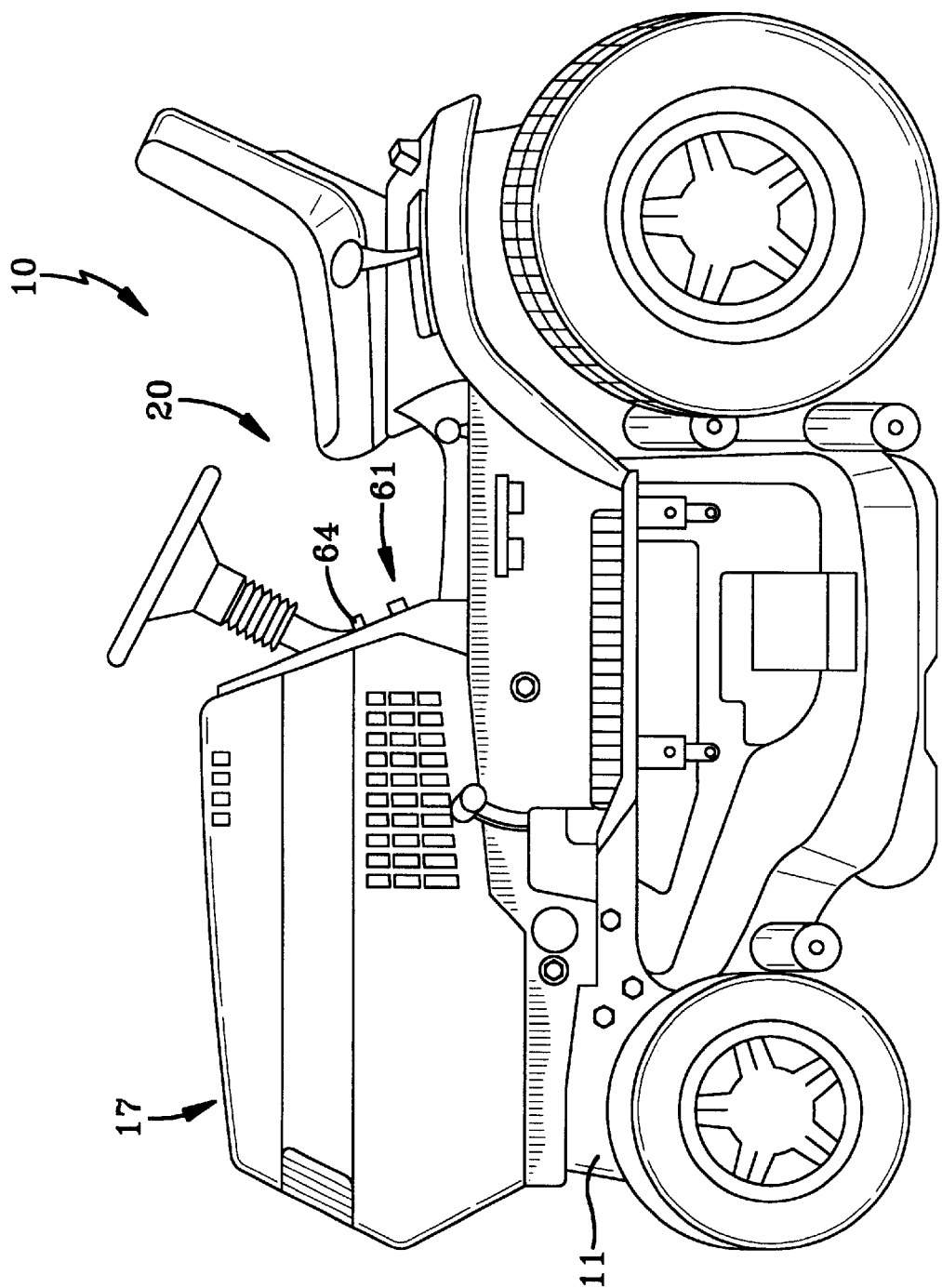
FIG. 1 is a perspective side view of a typical riding lawn mower such as might use the control mechanism of the present invention.

Referring now to the drawings wherein the showings are for purposes of illustrating a preferred embodiment of the invention only and not for purposes of limiting the same, FIG. 1 shows a riding lawn mower 10 which is equipped with the present invention, a control system 20. Throughout this disclosure the invention is described with reference to a riding lawn mower but the invention is also applicable to other mechanical devices and tractors, such as garden tractors. This invention is applicable to other mowers, off-the-road vehicles, and other applications as well. The riding lawn mower 10 includes a body 11, an engine 17 and a control panel 61. The engine 17 rotates an engine drive shaft (shown as item 18 in FIG. 2) as is commonly known in the art. The engine 17 includes, as shown schematically in FIG. 2, an air filter 54, a carborator 52, and an intake manifold 53 that are used as is commonly known in the art and therefore will not be discussed in any detail. However, it should be noted that the intake manifold 53 is a source of vacuum and is used as such in the preferred embodiment of this invention. In the preferred embodiment the control system 20 is used to control an associated power take off (PTO) shaft (shown as item 13 in FIG. 2). As is known in the art, a PTO shaft is used to drive associated implements such as cutting blades, cultivators and the like. It should be noted that the control system 20 of this invention is useful in controlling other items such as brake systems, clutch systems and other applications as well.

Figure 2:
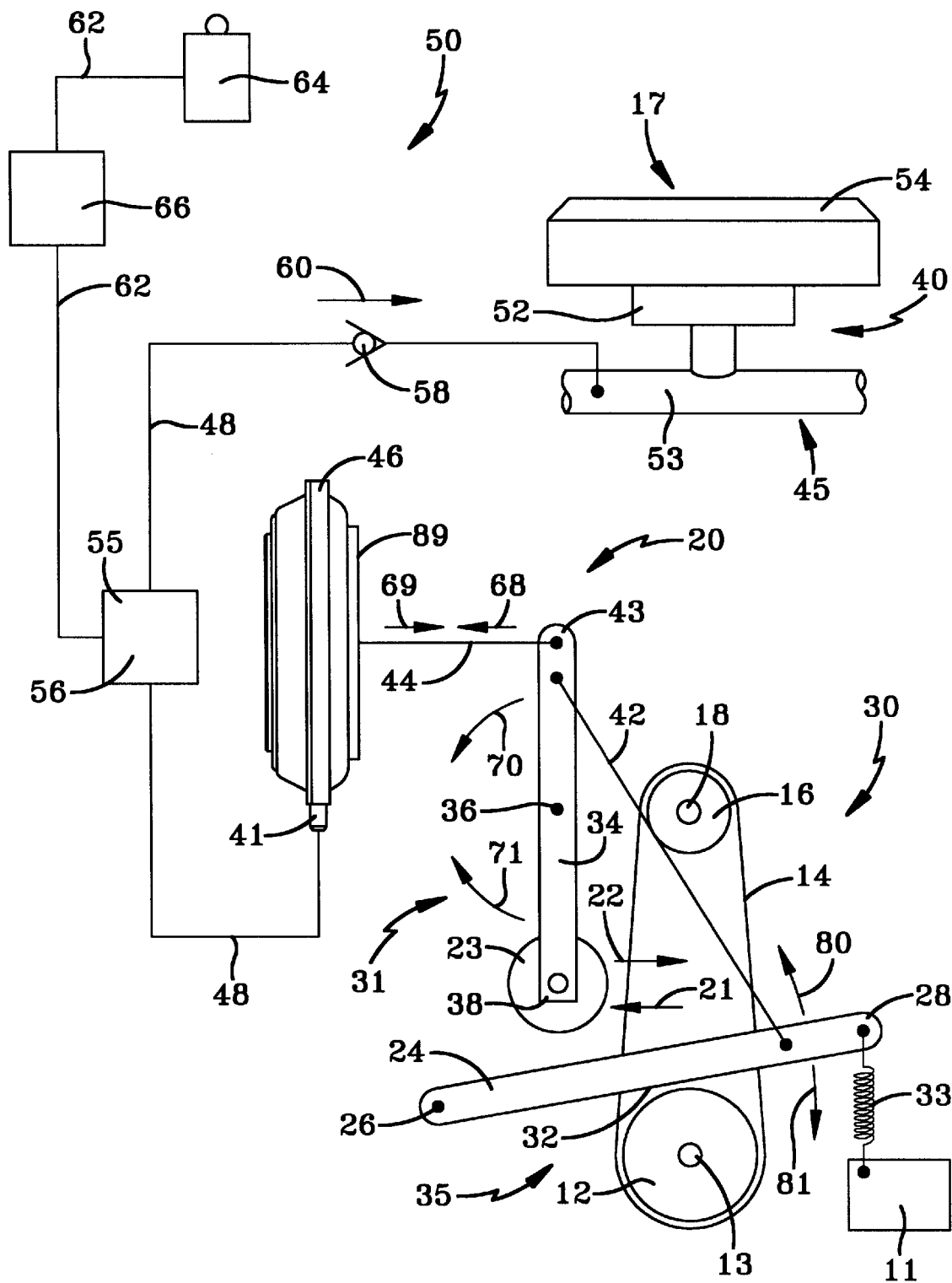
FIG. 2 is a schematic drawing illustrating the present invention in a preferred embodiment that includes a vacuum actuator, a mechanical clutching means, a braking mechanism, a vacuum means, and activating means.
Figure 3:
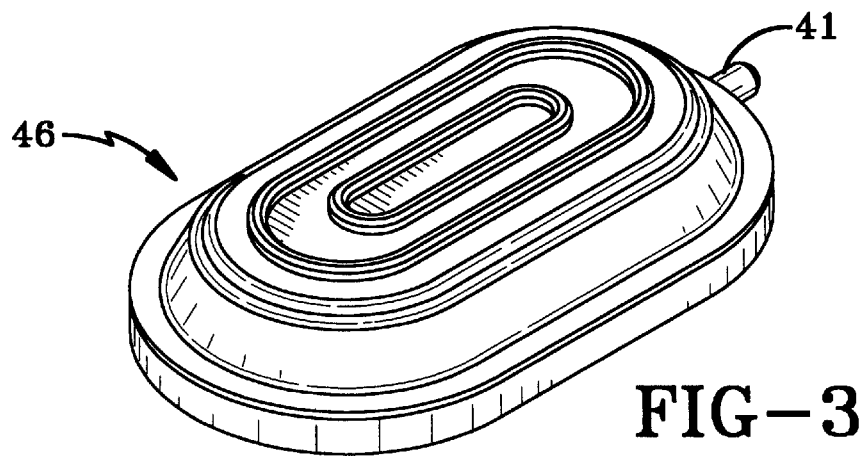
FIG. 3 is a perspective top view of the preferred vacuum actuator of the present invention.
Figure 4:
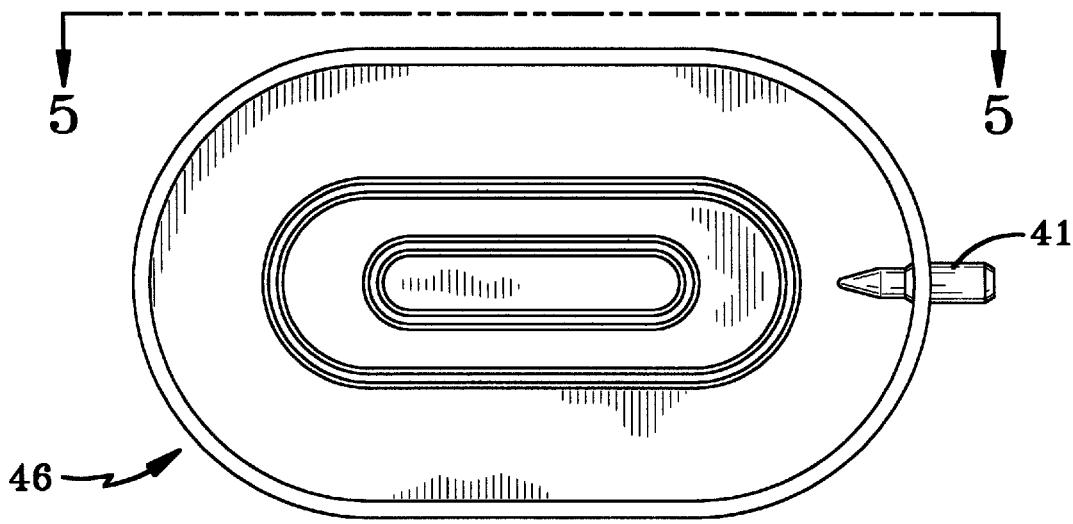
FIG. 4 is a top view of the vacuum actuator of FIG. 3 showing the connection port.
Figure 5:
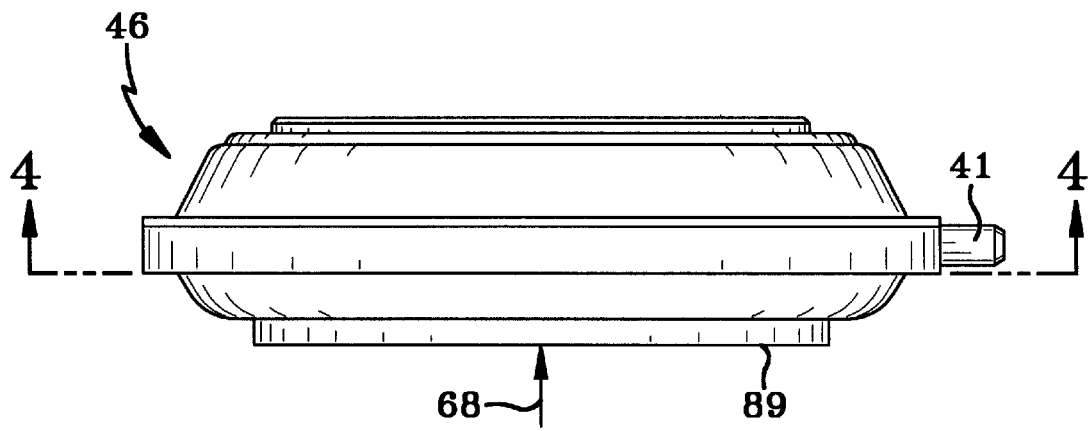
FIG. 5 is a side view of the vacuum actuator taken along the line 5—5 of FIG. 4 showing that a first side can be moved in an inward direction.

With reference now to FIG. 2, the PTO shaft 13 is rotated by a PTO pulley 12 rigidly connected thereon. The PTO pulley 12 is driven by a PTO belt 14, that is selectively driven by a drive pulley 16, that is rigidly connected to the engine drive shaft 18. Thus, the engine drive shaft 18 can be used to rotate the PTO shaft 13. The PTO belt 14, however, remains loose and non-engaged to the PTO pulley 12 until it is forced into engagement by clutching means to be discussed below.

With continuing reference to FIG. 2, the control system 20 of the present invention includes a vacuum actuator 46 and connecting means 30 for operatively connecting the vacuum actuator 46 to an associated device that in this embodiment is the PTO shaft 13. The control system 20 also includes a vacuum means 40 for providing a vacuum to the vacuum actuator 46 and an activating means 50 for selectively electrically activating the vacuum actuator 46.

With reference now to FIGS. 2–5, any vacuum actuator chosen with sound engineering judgement is useful for this invention but in the preferred embodiment, the vacuum actuator 46 is model number CO4 Type G and is made by Corea of France. The vacuum actuator 46 has a connection port 41 for operative connection to an associated vacuum source 45. In the preferred embodiment, the connection port 41 is connected to a vacuum line 48. The vacuum actuator 46 also has a first side 89 which moves inwardly, i.e. in direction 68, as a vacuum is established inside the vacuum actuator 46.

With reference to FIGS. 1 and 2, the connecting means 30 of the control system 20 includes a connector link 44 and clutching means that is preferably a mechanical clutching means 31. The connector link 44 can be of any type chosen with sound engineering judgement that is able to receive and transmit both tensive and compressive forces. The connector link 44 is operatively connected to the first side 89 of the vacuum actuator 46 and can be moved accordingly. By moved accordingly it is meant that as a vacuum is established inside the vacuum actuator 46 and the first side 89 of the vacuum actuator 46 moves in direction 68, the connector link 44 is also moved in direction 68. Likewise, as a vacuum is diminished within the vacuum actuator 46 and the first side 89 of the vacuum actuator 46 moves in direction 69, the connector link 44 is also moved in direction 69.

Referring to FIG. 2, the control system 20 of this invention is useful with any mechanical clutching means chosen with sound engineering judgement, but in the preferred embodiment the mechanical clutching means 31 includes a clutch arm 34. The clutch arm 34 has a first end 43 pivotably connected to the connector link 44, a mid-point 36 pivotably connected to the body (shown as item 11 in FIG. 1) of the riding lawn mower 10, and a second end 38 rotatably connected to an idler pulley 23. When the clutch arm 34 is pivoted about the mid-point 36 in a counter-clockwise direction 70 (such a motion would occur when the connector link 44 is moved in direction 68), the idler pulley 23 moves in direction 22 contacting the PTO belt 14 and thereby tightening it. When the PTO belt 14 is tight, the PTO pulley 12 is engaged with the drive pulley 16 and thus the PTO shaft 13 may be rotated. When the clutch arm 34 is pivoted in a clockwise direction 71 (such a motion would occur when the connector link 44 is moved in direction 69), on the other hand, the idler pulley 23 moves away from the PTO belt 14 thereby loosening the PTO belt 14 and disengaging the PTO shaft 13. It should be appreciated that the mechanical clutching means 31 herein disclosed provides efficient and dependable clutching without the abrupt jarring commonly known with electromagnetic clutching means.

Referring again to FIGS. 1 and 2, though it is not required for this invention, it is preferred that the connecting means 30 also include a braking mechanism 35 that is operatively connected to the mechanical clutching means 31. The preferred braking mechanism 35 includes a brake arm 24 having a first end 26 pivotably connected to the body (shown as item 11 in FIG. 1) and a second end 28 that is pivotably connected to a spring 33. The spring 33 is rigidly connected to the body 11 of the riding lawn mower 10. The brake arm 24 also has a brake pad 32 fixedly attached thereon. A clutch link 42 is pivotably connected to the second end 28 of the brake arm 24 and to the first end 43 of the clutch arm 34. The clutch link 42 can be of any type chosen with sound engineering judgement that is able to receive and transmit tensive forces. It should be noted that the spring 33 holds the brake arm 24 in braking engagement with the PTO pulley 12. By braking engagement it is meant that the brake pad 32 is held against the PTO pulley 12 preventing the PTO pulley 12 from rotating. It should be noted that when the clutch arm 34 is pivoted about mid-point 36 in counter-clockwise direction 70, tension is applied to the clutch link 42 causing the brake arm 24 to pivot about the first end 26 in a counter-clockwise direction 80. When the brake arm 24 is moved in counter-clockwise direction 80 the biasing force of the spring 33 is overcome and the brake pad 32 is lifted away from the PTO pulley 12, thereby permitting the PTO pulley 12 to rotate. When the clutch arm 34 is pivoted in clockwise direction 71, tension is removed from the clutch link 42 and thus the biasing force of the spring 33 causes the brake arm 24 to pivot in a clockwise direction 81 bringing the brake arm 24 into braking engagement with the PTO pulley 12.

With reference to FIG. 2, the vacuum means 40 used with the control system 20 of this invention can be of any type chosen with sound engineering judgement. The preferred vacuum means 40 includes a vacuum source 45 that is preferably the intake manifold 53. Other vacuum sources chosen with sound engineering judgement could also be used with this invention. The preferred vacuum means 40 also includes a vacuum line 48 that communicates the intake manifold 53 to a non-return valve 58, the non-return valve 58 to a control valve 55, and the control valve 55 to the connection part 41 of the vacuum actuator 46. The non-return valve 58 which can be of any type currently known in the art, permits airflow only in direction 60, from the vacuum actuator 46 to the intake manifold 53. The non-return valve 58 prevents air flow from the intake manifold 53 to the vacuum actuator 46. In this way a vacuum can be maintained within the vacuum actuator 46 even as the engine 17 is turned off and airflow stops within the intake manifold 53.

With continuing reference to FIG. 2 the activating means 50 of the control system 20 includes the control valve 55 that is preferably a solenoid valve 56. As is commonly known in the art, a solenoid valve, such as the solenoid valve 56, is selectively opened and closed using electromagnetism. When the solenoid valve 56 is closed, air cannot flow between the intake manifold 53 and the vacuum actuator 46. When the solenoid valve 56 is open, however, air flows from the vacuum actuator 46 through the open solenoid valve 56 and into the intake manifold 53. In this was a vacuum can be established and maintained within the vacuum actuator 46. The activating means 50 also includes an electric switch 64 that is mounted to the control panel 61 (as shown in FIG. 1) and a relay interlock 66. Electrical connecting means 62, such as electrical wires, electrically connect the electric switch 64 to the relay interlock 66 and the relay interlock 66 to the solenoid valve 56. The use of the electric switch 64 and the relay interlock 66 is commonly known in the art and therefore will not be discussed in any detail. It should be noted, however, that the electrical switch 64 is easily switched by an operator and requires no manipulation of a mechanical lever or the like.

With reference now to FIGS. 1–2, to engage the PTO shaft 13 the operator first starts the engine 17 of the riding lawn mower 10 and then switches the electric switch 64 into an "on" position thereby electro-magnitizing the solenoid valve 56 into an open position. The open solenoid valve 56 allows the intake manifold 53 to draw air out of the vacuum actuator 46 through the vacuum line 48. In this way a vacuum is established inside the vacuum actuator 46. The vacuum within the vacuum actuator 46 causes the first side 89 of the vacuum actuator 46 to move in direction 68 thereby pulling the connector link 44 in direction 68 as well. As the connector link 44 moves in direction 68 it causes the clutch arm 34 to pivot about its mid-point 36 in counterclockwise direction 70. The counterclockwise motion of the clutch arm 34 accomplishes two things. First, it places tension on the clutch link 42 causing the brake arm 24 to pivot about the first end 26 in counterclockwise direction 80. In this way, the brake pad 32 is lifted away from the PTO pulley 12, taking the PTO pulley 12 out of braking engagement and permitting the PTO pulley 12 to rotate. Secondly, the counterclockwise motion 70 of the clutch arm 34 causes the idler pulley 23 to move in direction 22 thereby causing the PTO belt 14 to engage, permitting the PTO shaft 13 to be rotated by the PTO pulley 12.

With continuing reference to FIGS. 1–2 to disengage the PTO shaft 13 the operator switches the electric switch 64 into an "off" position thereby electro-magnetizing the solenoid valve 56 into a closed position. The closed solenoid valve 56 disconnects the vacuum actuator 46 from the intake manifold 53. In this way after a short time the vacuum within the vacuum actuator 46 is removed. This causes the first side 89 of the vacuum actuator 46 to move in direction 69 thereby pushing the connector link 44 in direction 69 as well. As the connector link 44 moves in direction 69 it causes the clutch arm 34 to pivot in clockwise direction 71. The clockwise motion of the clutch arm 34 accomplishes two things. First, it removes tension from the clutch link 42 thereby allowing the biasing force of the spring 33 to pivot the brake arm 24 in clockwise direction 81. In this way, the brake pad 32 is brought into operative contact with the PTO pulley 12, putting the PTO pulley 12 into braking engagement and thereby stopping its rotation. Secondly, the clockwise motion 71 of the clutch arm 34 causes the idler pulley 23 to move in direction 21 thereby loosening the PTO belt 14 and disengaging the PTO shaft 13.

The invention has been described with reference to a preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A control system for controlling a PTO shaft on a riding lawn mower, the lawn mower having a body, a control panel, an engine with an intake manifold and a drive pulley, a PTO pulley for selectively rotating the PTO shaft, and a PTO belt that selectively operatively connects the PTO pulley to the drive pulley, said control system comprising:

(1) a vacuum actuator having a connection port and a first side that is selectively movable;
   (2) connecting means for operatively connecting said vacuum actuator to the PTO shaft, said connecting means including,
      (a) a clutch arm having first and second ends and a mid-section that is pivotably connected to the body of the lawn mower,
      (b) an idler pulley rotatably connected to said second end of said clutch arm,
      (c) a connector link operatively connected to said first side of said vacuum actuator and pivotably connected to said first end of said clutch arm, said connector link selectively pivoting said clutch arm wherein said idler pulley selectively forces the PTO belt to engage the PTO pulley to the drive pulley,
      (d) a brake arm having first and second ends, said first end of said brake arm being pivotably connected to the body of the lawn mower,
      (e) a brake pad fixedly attached to said brake arm,
      (f) a spring pivotably connected to said second end of said brake arm and rigidly connected to the body of the lawn mower, said spring selectively holding said brake pad in braking engagement with the PTO pulley,
      (g) a clutch link pivotably connected to said first end of said clutch arm and pivotably connected to said second end of said brake arm, said clutch link selectively pivoting said brake arm wherein said brake pad is taken out of braking engagement with the PTO pulley,
   (3) vacuum means for providing a vacuum to said vacuum actuator, said vacuum means including,
      (a) a vacuum line operatively connecting said connection port of said vacuum actuator to the intake manifold,
      (b) a non-return valve operatively connected to said vacuum line, said non-return valve permitting airflow from said vacuum actuator to the intake manifold and preventing airflow from the intake manifold to said vacuum actuator; and,
   (4) activating means for selectively electrically activating said vacuum actuator, said activating means including,
      (a) a solenoid valve that is selectively openable and operatively connected to said vacuum line, said solenoid valve selectively permitting airflow from said vacuum actuator to the intake manifold,
      (b) an electric switch that is selectively switchable and is mounted to the control panel of the lawn mower, said electric switch selectively opening said solenoid valve, (c) electrical connecting means operatively connecting said electric switch to said solenoid valve.

2. A control system for controlling an associated PTO shaft operatively connected to an associated vehicle having a body, an engine with a drive pulley, a PTO pulley for selectively rotating the associated PTO shaft, and a PTO belt that selectively operatively connects the PTO pulley to the drive pulley, the control system comprising:

a vacuum actuator;

connecting means for operatively connecting said vacuum actuator to the associated PTO shaft, said connecting means including,
   A) a clutch arm that is pivotably connected to the body of the associated vehicle, said vacuum actuator selectively operatively connecting said clutch arm to the associated PTO shaft; and,
   B) an idler pulley, said idler pulley being rotatably connected to said clutch arm, said idler pulley selectively forcing the PTO belt to engage the PTO pulley to the drive pulley;

vacuum means for providing a vacuum to said vacuum actuator; and, activating means for selectively electrically activating said vacuum actuator.

3. A. The control system of claim 2 wherein said connecting means further comprises:

a brake arm, said brake arm being pivotably connected to the body of the associated vehicle, said vacuum actuator selectively pivoting said brake arm out of braking engagement with the PTO pulley.

4. A. The control system of claim 3 wherein the engine has an intake manifold, said activating means comprising:

a control valve that is selectively openable, said control valve selectively permitting airflow from said vacuum actuator to the intake manifold; and, an electric switch that is selectively switchable, said electric switch selectively opening said control valve.

5. A method for engaging a PTO shaft, the method comprising the steps of:

providing a vehicle having a body, an engine and a PTO shaft;

providing a control system connected to the body and including a control valve electrically connected to a electric switch and operatively connected to a vacuum actuator, the vacuum actuator being operatively connected to the PTO shaft, switching the electric switch thereby opening the control valve;

activating the vacuum actuator; and, engaging the PTO shaft.

6. The method of claim 5 further comprising the steps of:

providing the vehicle with a mechanical clutching means operatively connected to the PTO shaft and to the vacuum actuator; and, after the step of activating the vacuum actuator,
   engaging a mechanical clutching means.

7. The method of claim 5 further comprising the steps of:

providing the vehicle with a drive pulley operatively connected to the engine and a PTO pulley for use in rotating the PTO shaft; and, after the step of activating the vacuum actuator,
   connecting the PTO pulley into operative connection with the drive pulley.

8. The method of claim 7 further comprising the steps of:

providing the vehicle with a PTO belt that selectively operatively connects the PTO pulley to the drive pulley and an idler pulley that selectively contacts the PTO belt; and, wherein the step of connecting the PTO pulley into operative connection with the drive pulley comprises the step of,
   forcing the idler pulley into operative engagement with the PTO belt thereby engaging the PTO pulley to the drive pulley.

9. The method of claim 8 wherein, before the step of forcing the idler pulley into operative engagement with the PTO belt thereby engaging the PTO pulley to the drive pulley, the method comprises the steps of:

providing the vehicle with a brake arm having a first end pivotably connected to the body of the vehicle and a second end with a brake pad that selectively contacts said PTO pulley; and, before the step of forcing the idler pulley into operative engagement with the PTO belt thereby engaging the PTO pulley to the drive pulley, pivoting the brake arm thereby taking said PTO pulley out of braking engagement.

10. The method of claim 8 further comprising the steps of:

providing the vehicle with a clutch arm pivotably connected to the body having a first end operatively connected to the vacuum actuator, and a second end rotatably connected to the idler pulley; and, wherein the step of forcing the idler pulley into operative engagement with the PTO belt thereby engaging the PTO pulley to the drive pulley, comprises the step of, pivoting the clutch arm about the body.

11. A method for disengaging an associated PTO shaft, the method comprising the steps of:

disconnecting a vacuum actuator;

pivoting a brake arm;

contacting a PTO pulley with a brake pad fixedly attached to said brake arm.

12. The method of claim 11 wherein, before the step of disconnecting a vacuum actuator, the method comprises the step of:

switching an electric switch.

13. The method of claim 12 wherein, after the step of pivoting a brake arm, the method comprises the step of:

loosening a PTO belt.

* * * * *